US006486768B1

United States Patent
French et al.

(10) Patent No.: US 6,486,768 B1
(45) Date of Patent: Nov. 26, 2002

(54) CART RETURN LOYALTY CREDIT SYSTEM

(75) Inventors: John R. French, San Diego, CA (US); Philip Witham, Portland, OR (US)

(73) Assignee: CartTronics, LLC, San Diego, CA (US)

(*) Notice: Subject to any disclaimer, the term of this patent is extended or adjusted under 35 U.S.C. 154(b) by 0 days.

(21) Appl. No.: 09/153,912

(22) Filed: Sep. 16, 1998

(51) Int. Cl.[7] .................................................. G06F 7/04
(52) U.S. Cl. ........................ 340/5.92; 194/211; 194/213; 194/905; 705/14; 705/26; 235/383; 235/385
(58) Field of Search ........................ 340/5.92; 194/211, 194/213, 905; 705/26, 14; 235/383, 385

(56) References Cited

U.S. PATENT DOCUMENTS

| | | | |
|---|---|---|---|
| 3,882,982 A | 5/1975 | Smith ........................ 194/4 C |
| 3,897,863 A | 8/1975 | Peggs ........................ 194/4 R |
| 3,938,638 A | 2/1976 | Moule ........................ 194/4 C |
| 4,424,893 A | 1/1984 | Gillet ............................ 194/4 |
| 4,470,495 A | * 9/1984 | Unger ........................ 194/4 C |
| 4,549,182 A | 10/1985 | Gillet ........................ 340/942 |
| 4,572,347 A | 2/1986 | Eiserman .................... 194/205 |
| 4,623,877 A | * 11/1986 | Buckens ..................... 340/572 |
| 5,056,019 A | 10/1991 | Schultz et al. ............... 364/405 |
| 5,119,087 A | 6/1992 | Lucas .................... 340/825.35 |
| 5,360,094 A | 11/1994 | Adams et al. ............... 194/212 |
| 5,485,006 A | 1/1996 | Allen et al. .............. 250/222.1 |
| 5,526,916 A | 6/1996 | Amdahl et al. .............. 194/211 |
| 5,592,560 A | 1/1997 | Deaton et al. ............... 382/100 |
| 5,687,322 A | 11/1997 | Deaton et al. ............... 395/214 |
| 5,708,782 A | * 1/1998 | Larson et al. ................ 395/214 |
| 6,024,203 A | * 2/2000 | Amdahl et al. .............. 194/213 |

FOREIGN PATENT DOCUMENTS

| | | | |
|---|---|---|---|
| DE | 30 02 798 A 1 | 7/1981 | ............. G07C/9/00 |
| DE | 31 30 543 A 1 | 2/1983 | ........... A47F/10/04 |
| EP | 0 025 754 B1 | 9/1980 | ............. G07F/7/06 |
| GB | 2 122 792 A | 1/1984 | ............. G07F/7/06 |
| WO | WO 85/00961 | 3/1985 | |
| WO | WO 97/11441 | 3/1997 | |
| WO | WO 98/51197 | 11/1998 | |

* cited by examiner

Primary Examiner—Michael Horabik
Assistant Examiner—M Shimizu
(74) Attorney, Agent, or Firm—Knobbe, Martens, Olson & Bear, LLP (57) ABSTRACT

A system and method for providing an incentive to a cutomer of a store to return a shopping cart to a cart return location. The cart return location, such as a cart corral, has a plurality of detection loops at an entrance to the corral. The system detects a change in inductance of the loops when a cart is returned to the cart corral and generates a cart return signal, which is indicative of a returned cart, in response to the change of inductance. The system determines wheather a cart is being removed from or returned to the cart corral by use of the multiple detection loops. Visual and/or audible feedback indicative of an action may be provided to the customer.

43 Claims, 6 Drawing Sheets

Figure 9 Three lane, twelve loop array:

RF ID Tag

Figure 12  Cart Detector circuit

Figure 13  System Electronics

FIG. 14

Credit Granting function

CART RETURN LOYALTY CREDIT SYSTEM

BACKGROUND OF THE INVENTION

2. Field of the Invention

The present invention generally relates to a reward system and method for wheeled vehicles, and more specifically, to a way to encourage the return of a shopping cart to a cart return location.

2. Description of the Related Technology

Wheeled shopping carts are conventionally provided by supermarkets, discount stores and other retail stores for the convenience of shoppers such that relatively large loads of goods can be collected, paid for and then wheeled out to the shoppers vehicle for unloading. A few shoppers will voluntarily return a cart to a central cart return location, such as a cart corral. Typically, however, the shopper leaves the cart in the vicinity of where the vehicle is parked. The empty cart must then be collected by store personnel and returned to the store for subsequent use. Substantial costs may be incurred associated with the process of retrieving the carts from the far corners of the site and collecting them into a central cart corral or a cart line in front of the store. A typical store may spend from one to six man-years in the collection process, and incur additional indirect costs associated with injury and disability claims. Worldwide, labor costs of cart collection add up to millions of dollars.

Additionally, some carts may be removed from the store parking lot. For example, a shopper without a vehicle may use the cart to transport goods back to his home and then abandon the cart. This can result in permanent loss of the cart. Furthermore, thieves may intentionally abscond with carts for the purpose of later resale to other retailers. Loss of shopping carts results in substantial financial loss to the retailer, since each cart is a relatively expensive piece of equipment.

According to the Food Marketing Institute (FMI) in one recent year, U.S. retailers annually lost approximately 11% of their carts with a value of $185 million, plus another $117 million in cart retrieval expenses. Because it is common for shoppers to "borrow" carts to transport their purchases home or to a transit stop, retailers must contract for regular cart retrieval services. Retrieval contractors comb their neighborhoods several times per day or week, at substantial cost to the retailer. The total impact is typically thousands of dollars per site per year. Once off-site, carts are often taken great distances, experiencing worn wheels and other damage. Rough handling during the collection process often further damages those carts that are retrieved. Extra cleaning and repair that may be required following retrieval could easily add thousands of dollars of additional expenses per store per year. Furthermore, to compensate for carts that are off-site, retailers typically maintain excess cart inventories, often 10% to 20% over their actual need, to ensure that enough carts are available during peak shopping hours. At some sites, the total of all these costs may exceed $100,000 per site.

Numerous proposals have been made in the past for devices to deter shoppers or others from removing carts from the immediate vicinity or parking lot of a store. Such devices typically include some type of wheel locking mechanism which is activated when the cart crosses a boundary of some type around the perimeter of the parking lot or travels a fixed distance from a store exit. However, these concepts do not provide incentives to discourage removal of a cart from the lot or to return the cart to the cart corral.

One method increasingly used by retailers to encourage repeat business is a frequent shopper program, also known as a reward or loyalty program. In such a program, a customer is typically issued a card having a unique customer identification code. The card is issued after the customer provides identifying information and usually some demographic information to the issuing store. This frequent shopper or reward card may be of various types, such as magnetic stripe, bar-code, or smart card technology having a non-volatile memory (proximity, and so forth).

According to In-Store, the newsletter of In-Store Marketing & Business, a current survey of frequent shopper or reward program penetration shows that there are now more than 7,750 supermarkets in the United States that have card-based frequent shopper programs, which represents about 26% of all supermarkets. This is up from 19% (5,867 stores) of total United States supermarkets in the 1st Quarter of 1997. The growth in loyalty card programs is similar throughout the developed countries of the world. A supermarket is defined as a grocery store with more than $2 million in annual sales.

The use of these reward programs continues to grow at a rapid pace. Fifty chains with twenty or more stores and seventy-five retailers with fewer than twenty stores now have or are in the process of rolling out frequent shopper programs. Over 72% of the frequent shopper store count is made up by chains with more than $2.0 billion of annual sales. The percentage of frequent shopper penetration now represents 22.5% of All Commodity Volume (ACV) in the United States, which is up from 17.4% in the first quarter of 1997. It is estimated that 3,600 additional supermarkets will add frequent shopper programs soon, which would mean that about 38% of all supermarkets will have a reward program. Similar growth in loyalty card programs may be anticipated throughout the developed countries of the world.

ACNielsen performs an annual "Frequent Shopper Programs" study. The ability to use a frequent shopper or loyalty card was cited as more important by card holders than every-day low pricing or customer service. When card holders initially joined their shopper card programs, savings was cited as the primary reason by nearly 75% of card holders, with check cashing the number two reason at 15%. Today, many card holders have had a frequent shopper card over 12 months, and savings continues to be the primary reason for card usage. Over 50% of the card holders are primarily looking for special deals on products. Although the most often cited reason for shopping in a particular store is still location, the ability to use a frequent shopper card ranked third in importance, next to location and store deals.

Currently, 55% of households in the United States have at least one grocery store loyalty card. A similar ACNielsen study one year ago showed that only 35% of households had a card. The highest percentage of card holders was found in Chicago, with 94% of households having at least one store card. Other top markets include Los Angeles, New York, Buffalo/Rochester and Charlotte, N.C.

A system and method is desired that would enlist the help of customers in the cart collection process. To accomplish this, such a system and method would elicit supportive behavior of a shopper by providing incentives and rewards to return a shopping cart to a cart return location. These incentives would provide a reward to the shopper for returning a shopping cart and to encourage repeat business. The system and method would thus provide direct benefits to both the customer and the store operator.

It is also desired to have a shopping cart return system that can be associated with a frequent shopper or rewards program. Such a cart return system would be able to integrate with the existing store infrastructure so as to minimize store expenses and not require customers to learn a totally new system or new procedure.

SUMMARY OF THE INVENTION

One aspect of the present cart return loyalty credit system invention is a system consisting of a sensor and a card reader which can be retrofitted to existing cart corrals.

In another aspect of the present invention there is an integrated system of sensors and card readers which may be newly constructed.

In another aspect of the present invention there is a cart return system for use by a store utilizing a computer, the system comprising a detection loop arranged at the entrance to a cart return location; a loop oscillator circuit connected to the detection loop; and a processing circuit, connected to the loop oscillator circuit, being capable of detecting a change in inductance of the loop and identifying a cart return condition in response to the loop oscillator circuit, wherein the processing circuit is capable of providing a customer identification code to the computer.

In another aspect of the present invention there is a method of providing an incentive for a customer of a store to return a shopping cart to a cart return location having a detection loop at the entrance to the cart return location, the method comprising detecting a change in inductance of the loop; generating a cart return signal, which is indicative of a returned cart, responsive to the change of inductance; obtaining a customer identification code proximal in time to the cart return signal; and sending the customer identification code to a computer.

In yet another aspect of the present invention there is a cart return system, comprising a detection loop arranged at the entrance to a cart return location; a loop oscillator circuit connected to the detection loop; and a processing circuit, being capable of detecting a change in inductance of the loop and identifying a cart return condition in response to the loop oscillator circuit, wherein the processing circuit is capable of providing a customer identification code.

In still another aspect of the present invention there is a method of providing an incentive for a customer of a store to return a shopping cart to a cart return location having a detection loop at the entrance to the cart return location, the method comprising detecting a change in inductance of the loop; generating a cart return signal, which is indicative of a returned cart, responsive to the change of inductance; obtaining a customer identification code proximal in time to the cart return signal; and storing the customer identification code in a memory.

In yet another aspect of the present invention there is a system of providing an incentive for a customer of a store to return a shopping cart to a cart return location having a detection loop at the entrance to the cart return location, the system comprising means for detecting a change in inductance of the loop; means for generating a cart return signal, which is indicative of a returned cart, responsive to the change of inductance; means for obtaining a customer identification code proximal in time to the cart return signal; and means for storing the customer identification code.

DETAILED DESCRIPTION OF THE PREFERRED EMBODIMENTS

The following detailed description of the preferred embodiments presents a description of certain specific embodiments to assist in understanding the claims. However, the present invention can be embodied in a multitude of different ways as defined and covered by the claims. Reference is now made to the drawings wherein like numerals refer to like parts throughout.

The purpose of the cart sensor system is to sense or register the return of the cart (the preferred customer behavior) and to enable the credit granting system whereby the customer receives credits or points or other benefits in return for their replacing the cart in the designated place.

The detailed description is organized into the following sections: Magnetic Stripe Cards and Readers, Shopping Carts, Physical Layouts of Cart Corral Sensors and Card Reader/Electronics Station, Cart Detector Circuit and System Electronics, Software Functions, and Store Infrastructure.

Magnetic Stripe Cards and Readers

Data can be encoded on magnetic stripe cards using a proprietary methodology or by employing an open or standard encoding pattern. The device that encodes data on a magnetic stripe is termed an encoder. The device that reads or decodes data from a magnetic stripe is termed a reader. There are common standards by which magnetic stripe cards are encoded. Such standards are created by organizations such as ANSI (American National Standards Institute) and the ABA (American Banking Association). Virtually all magnetic stripe cards, with the exception of those used for security or proprietary purposes, utilize these standards. Therefore, assuming a card has been encoded to the typical standard, any brand or model of reader built to a standard will be capable of reading (decoding) the magnetic stripe.

Standards have been developed for encoding three "tracks" on a magnetic stripe card. A track is basically a single physical line on the magnetic stripe where data are encoded. The tracks are referred to as Track 1, Track 2 and Track 3. What are laid-down on the tracks are bits—the off or on switches (zeroes and ones) that make up computer binary language. The density to which the bits are recorded are logically referred to as BPI, or bits-per-inch. What follows is an explanation of what makes up each track and what it normally encodes.

Track 1 is an alphanumeric track, recorded at 210 BPI at 7 bits per character. Its limit is 79 characters. In the case of a credit card, this track normally encodes the cardholder's name, card number and card expiry date. Included in the 79 characters are a number of delimiter and placeholder characters found on the track.

Track 2 is a numeric-only track, recorded at 75 BPI at 5 bits per character. Its limit is 40 characters. Track 2 on credit cards contains the cardholder's card number and expiry date. While these two pieces of data are also found on Track 1, the reasons for placing them on Track 2 are twofold. Firstly, it provides a degree of redundancy on the card, should one of the tracks be erased or become unreadable. The second reason is that a number of states and other jurisdictions do not allow for the non-discretionary recording of a person's name during a financial transaction.

Track 3 which is seldom used is numeric-only in nature, recorded at 210 BPI, 5 bits per character. It is termed the "thrift track". Up to 107 characters can be placed on Track 3.

Magnetic card readers and encoders can be purchased as single track, dual track and triple track. In the case of a dual track reader or encoder, it could be tracks 1 & 2, or 2 & 3.

As the name implies, magnetic stripe readers only read already-encoded magnetic stripes and they are used almost exclusively on-line (attached to a personal computer (PC) terminal or cash register). In a retail store, the reader and computing device form a part of a point-of-sale (POS) system. They are normally interfaced with a computer device either through an RS-232 serial connection, or via a keyboard wedge. This latter interface is most common in PC applications. In this case, the card reader shares the PC's keyboard port and all scanned data are accepted by the PC as if they were keyed in. Serial readers almost always require an external AC/DC power supply. Keyboard wedge readers "borrow" power from the keyboard port.

On-line magnetic stripe reader systems come in two basic styles: integrated decoder and non-integrated decoder. A decoder is the electronic circuitry that decodes the "raw" electrical signals generated by the reader. The main advantage of the integrated, one-piece systems is the low cost. Their main disadvantage is that should one of the components (reader or decoder) fail, the entire system will probably need to be replaced.

Most magnetic stripe readers are of the "swipe" type, where the card is manually drawn through a slot in the reader. One swipe-type magnetic card reader that is available from Panasonic is model ZU-M1242S1. Insertion readers, common on ATM machines, automated gas pumps and kiosks, are also available. Typically, insertion readers are integrated into other equipment, like kiosks or automatic teller machines (ATMs).

Shopping Carts

Shopping carts are provided by a variety of retail businesses to permit their customers to easily collect and move their purchases for transfer to their vehicle. There are several different types of shopping carts available in various sizes and configurations including all metal carts, metal framed carts with plastic baskets, metal with plastic coatings, and some made almost entirely of plastic.

Cart Corral Sensors and Card Reader/Electronics Station—Physical Layouts

Figure 1:
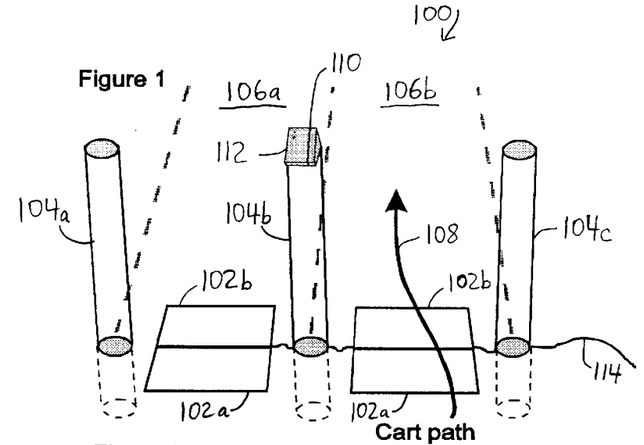
FIG. 1 is a perspective view diagram for one embodiment of a sensor, card reader and system electronics arrangement used with a cart corral in a cart return loyalty credit system of the present invention.

With the magnetic card technology in mind, and referring to FIG. 1, one embodiment of a portion of the cart return loyalty credit system 100 will be described. One possible embodiment of the cart sensor is a set of inductive loop sensors 102a and 102b buried in the pavement of a parking lot by cutting slots in the pavement, installing the wires, and filling the slots with paving material such as asphalt. Each loop sensor 102 may be two loop turns of 14 gauge stranded wire in one embodiment. The loop sensors 102 are located between vertical poles or members 104a, 104b and 104c defining one or more distinct lanes 106a and 106b for carts to pass through on a cart path, e.g., path 108. Optionally, the sensors 102 could be located at the entrance(s) to existing cart corrals. One or more customer card readers 110 is/are located nearby, optionally on top of one of the poles 104 in a housing also containing the system's electronics 112. Note that one or more of the poles 104a and/or 104c may be omitted. Furthermore, the system electronics 112 may be mounted on one of the other poles 104a or 104c. Optionally, the loop sensor coils 102 can be built into a flat, thin, rugged plastic case placed directly on the pavement surface, having one or more lanes and sets of coils. A connector 114 connects the electronics unit 112 to a store computer, as will be discussed in conjunction with FIG. 16. Optionally, the electronics unit could use wireless techniques, such as a Proxim RF Ethernet LAN system, to connect to the store computer.

Figure 2:
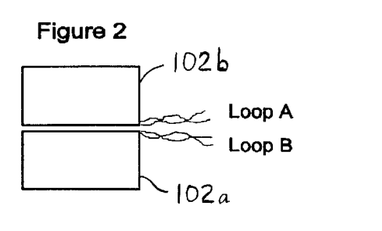
FIG. 2 is a top plan view diagram of the sensor loop configuration shown in FIG. 1.

Referring to FIG. 2, the sensor loop configuration shown in FIG. 1 will be described. The loop configuration is illustrated with two separate insulated wire coils 102a and 102b of one or more turns each, adjacent to each other. As a shopping cart passes over this pair of loops, a change in inductance is first detected in one coil, then the other. Which coil "sees" the cart first indicates the direction the cart is moving, i.e., in or out of the cart corral. The wires from these coils run underground and then may run up to the electronics housing 112 (FIG. 1).

Figure 3:
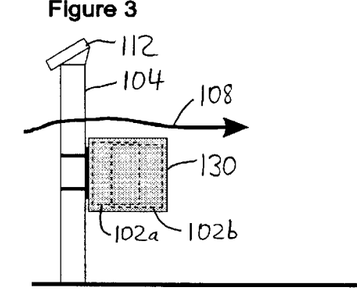
FIG. 3 is a side elevation view diagram for a second embodiment of a sensor, card reader and system electronics arrangement used with a cart corral.
Figure 4:
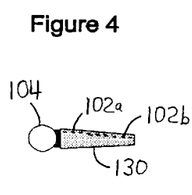
FIG. 4 is a top plan view diagram of the pole and sensor loop configuration shown in FIG. 3.

Referring to FIG. 3, a second embodiment of a portion of the cart return loyalty credit system 100 will be described. In this embodiment, the two inductive loops 102a and 102b are placed in a rigid case 130, such as durable plastic, mounted vertically on each pole 104 defining a distinct lane 106 as in FIG. 1. Thus there is a sensor case 130 for each lane 106. Referring to FIG. 4, a top view of the pole 104, loops 102a and 102b, and case 130, corresponding to the arrangement of FIG. 3, is shown.

Figure 5:
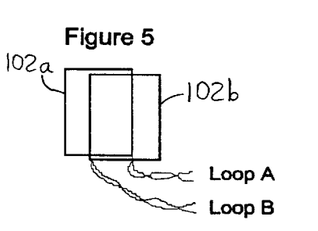
FIG. 5 is a side elevation view diagram of the sensor loop configuration shown in FIG. 3.

Referring to FIG. 5, a side view of the pole mounted sensor loop configuration of FIGS. 3 and 4 will be described. The configuration is similar to that shown in FIG. 2, but with the two loops 102a and 102b optionally overlapping somewhat for reduced sensor size. A metallic plate shield may be integrated into the sensor case 130 on one of the large sides in order to allow sensing of carts only on one side of the case 130.

Figure 6:
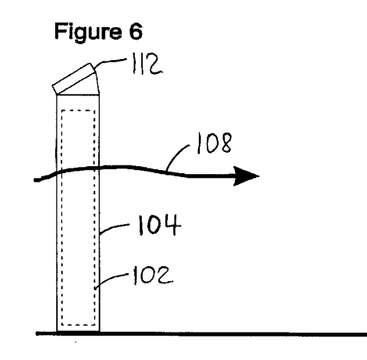
FIG. 6 is a side elevation view diagram for a third embodiment of a sensor, card reader and system electronics arrangement used with a cart corral.

Referring to FIG. 6, a third embodiment of a portion of the cart return loyalty credit system 100 will be described. In this embodiment, two inductive loops 102a and 102b are integrated into a non-metallic pole 104, perhaps 4 inches in diameter. One or more of these sensor-poles 104 would define cart lanes 106 as in FIG. 1. The system electronics 112 and card reader may optionally be integrated into the same pole 104.

Figures 7, 8:
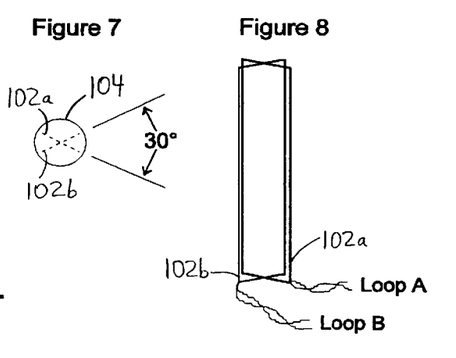
FIG. 7 is a top plan view diagram of the pole and sensor loop configuration shown in FIG. 6.
FIG. 8 is a perspective view diagram of the sensor loop configuration shown in FIG. 6.

Referring to FIG. 7, a top view of the pole 104 and the integrated loops 102a and 102b, corresponding to the arrangement of FIG. 6, is shown. The two coils are angled from each other, in this example, approximately 30 degrees to allow the system to sense the direction of cart travel. Other angles may be utilized in other embodiments.

Referring to FIG. 8, a perspective view of the sensor loop configuration for FIGS. 6 and 7 will be described. The loop configuration utilized in FIGS. 6 and 7 is two coils nearly the full height and full inside width of the pole, for maximum sensitivity. Of course, the height and width of the coils may vary from one application to another. The two coils are angled from each other, in this example, about 30 degrees. The difference in angles allows one coil to detect the shopping cart before the other, and hence, the system can determine if the shopping cart is moving in or out of the cart corral.

Figure 9:
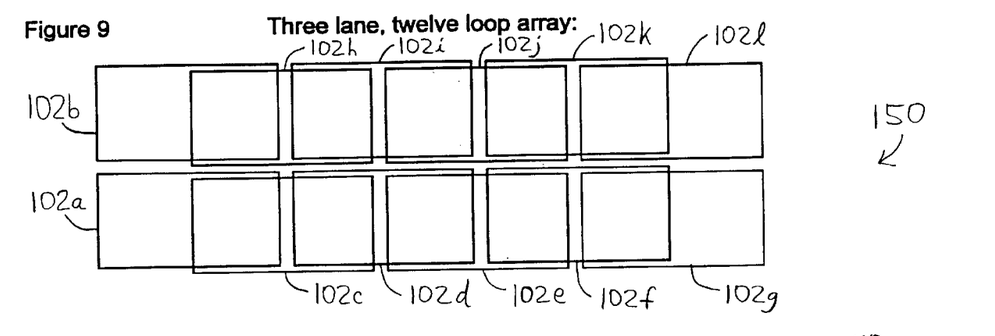
FIG. 9 is a top plan view diagram for a fourth embodiment of a sensor loop configuration used with a cart corral.
Figure 10:
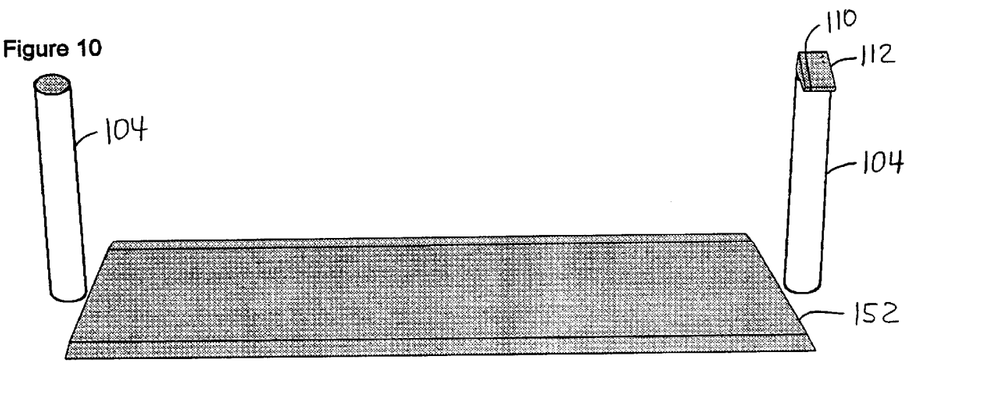
FIG. 10 is a perspective view diagram of a card reader, system electronics and sensor panel arrangement for the sensor loop configuration shown in FIG. 9.

Referring to FIGS. 9 and 10, a fourth embodiment of a portion of the cart return loyalty credit system 100 will be described. In this embodiment, a wide array 150 of inductive loops 102a–102l is molded into a flat plastic panel 152 placed on the pavement surface. Two poles 104 or other guides or markings cause shoppers to return carts over this array 150, but there is a large width between the poles 104, which permits for easy access for shopping carts. The array 150 of individual inductive loop sensors 102 allows the system electronics 112 to track the movement of several carts at once, and to track carts not traveling straight across the sensor. FIG. 9 illustrates one possible configuration of the array 150, among many. Here there is some overlap in width between the coils 102 to increase sensitivity and eliminate "dead zones" (areas of low sensitivity). In one embodiment, a single card reader 110 is used and is possibly integrated with the system electronics unit 112.

In the embodiments of FIGS. 1 and 2, and FIGS. 9 and 10, the loop sensors 102 may optionally be somewhat wider so as to enclose the base of the vertical poles 104 rather than just wide enough to fit between them.

Figure 11:
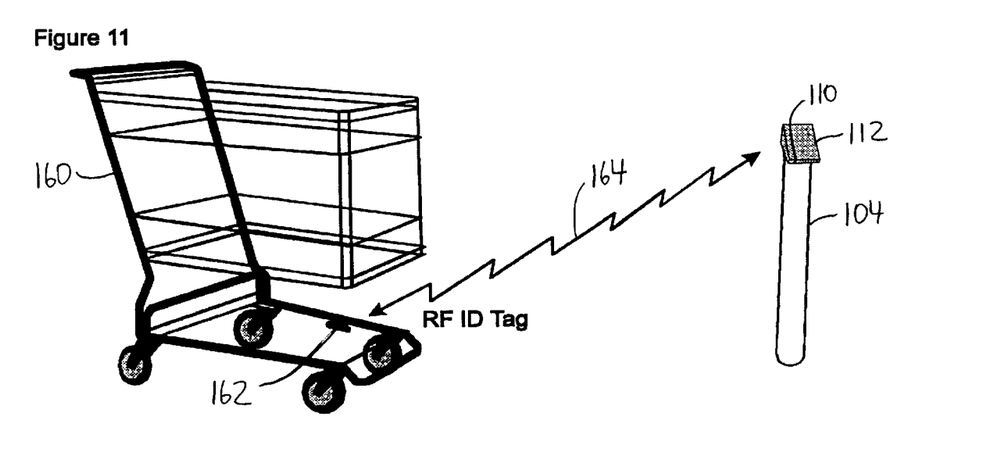
FIG. 11 is a perspective view diagram of a fifth embodiment of a cart, ID tag, card reader and system electronics arrangement used with a cart corral.

Referring to FIG. 11, a fifth embodiment of a portion of the cart return loyalty credit system 100 will be described. In this embodiment, individual radio frequency (RF) identification (ID) tags 162 are used on each shopping cart 160. The RF ID tags each wirelessly transmitting 164 a unique serial number. When returned to the proximity of the cart corral, electronics unit 112 and card reader 110, the system detects the return of the cart 160 by its ID number through coded RF signals.

Cart Detector Circuit and System Electronics

Figure 12:
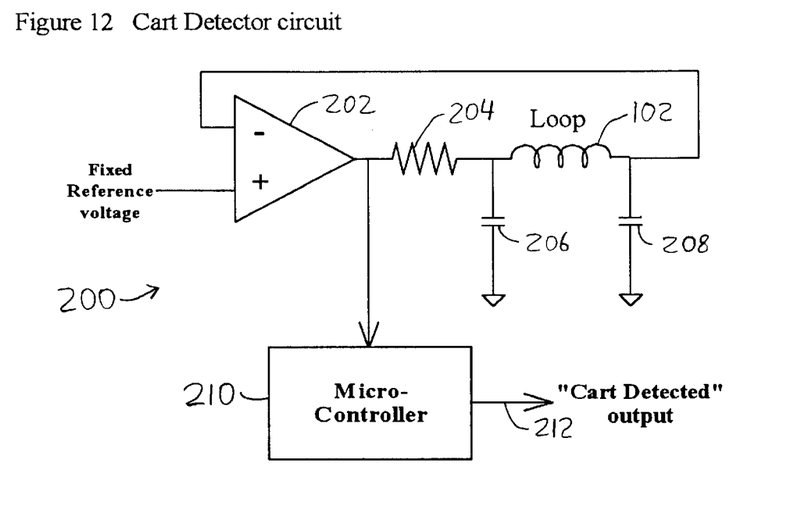
FIG. 12 is a diagram of a cart detector circuit utilized by the system electronics unit shown in any of FIG. 1, 3, 6, 10 or 11.

Referring to FIG. 12, one embodiment of a cart detector circuit 200 of the cart return loyalty credit system 100 will be described. In this embodiment, the shopping carts are detected (in cases not using RF ID tags) by a proximity detector using an inductive loop sensor and an oscillator. The circuit of FIG. 12 uses a comparator circuit 202, a 1 kOhm, ¼ Watt resistor 204, and two 1.0 µF film capacitors 206 and 208 to form an oscillator with the loop 102. In one embodiment, the loop is two turns. The presence of the metal in the shopping cart 160 (FIG. 11) causes a slight change in the frequency of the oscillator. This frequency is monitored by a small microcontroller integrated circuit (IC) 210, and if a sufficient change is detected, an output signal 212 indicates the presence of a cart by this loop.

Many different loop oscillator circuits are possible, but one embodiment uses a comparator circuit 202 built into the microcontroller chip 210, such as in the Microchip Technologies PIC16C622 IC. Using the PIC16C622 chip, the "fixed reference voltage" of FIG. 12 is also provided internally by the microcontroller chip.

Figure 13:
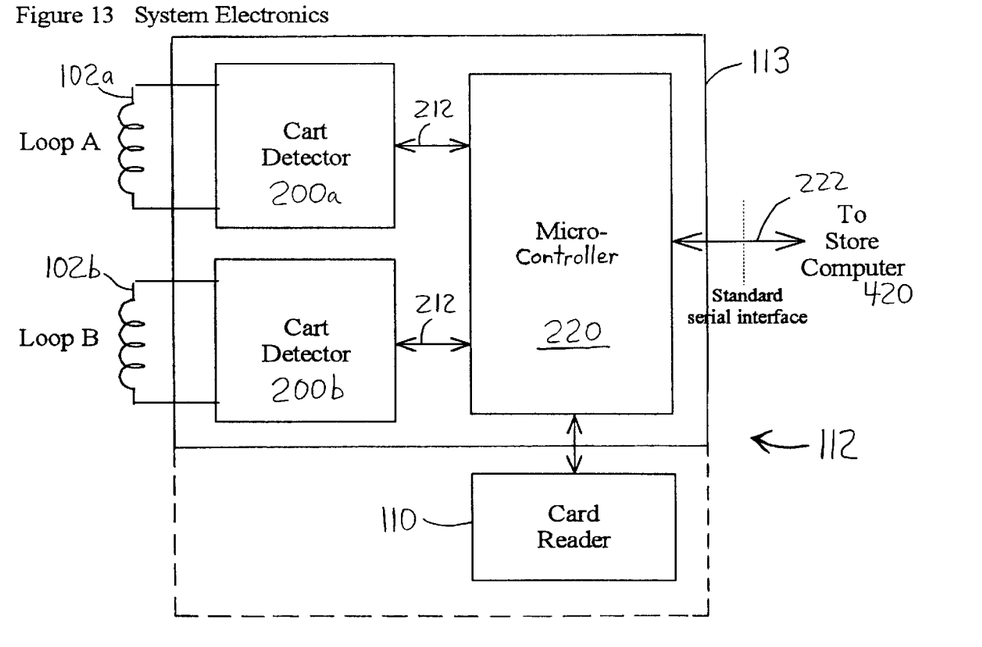
FIG. 13 is a block diagram of the system electronics unit and card reader shown in any of FIGS. 1, 3, 6, 10 or 11.
Figure 16:
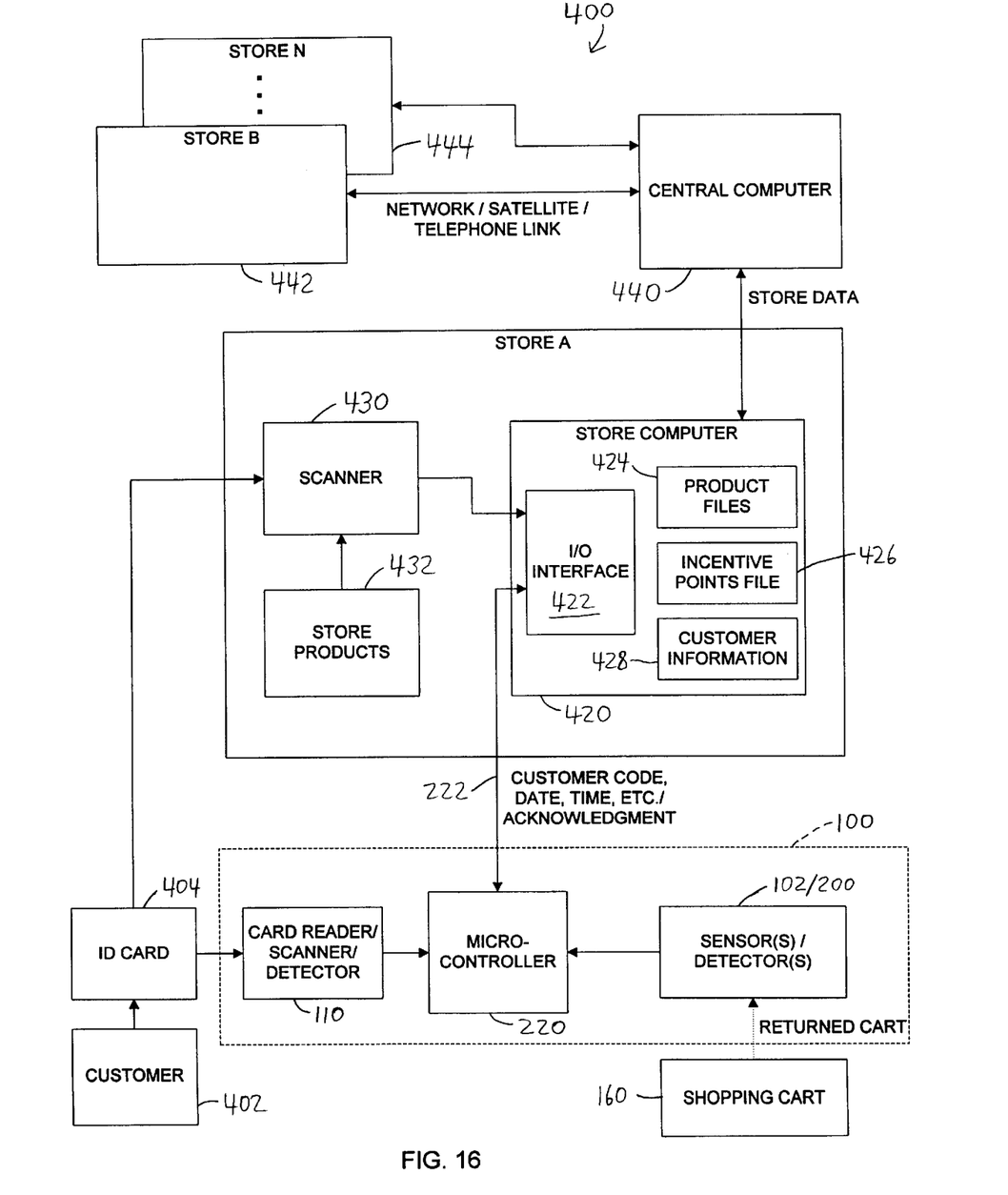
FIG. 16 is a block diagram showing the sensors, system electronics unit and card reader combined with a store infrastructure.

Referring to FIG. 13, one embodiment of the system electronics 112 of the cart return loyalty credit system 100 will be described. In one embodiment, the card reader 110 is integrated with the sensor and control electronics 113 in an enclosure. In another embodiment, the card reader 110 is separated from the enclosure for the system electronics 112. The sensor and control electronics 113 includes two or more cart detector circuits 200a (for loop 102a) and 200b (for loop 102b), a customer card reader 110, another microcontroller or a microprocessor 220, and an interface 222 to the store computer 420 (FIG. 16). The card reader 110 may be, for example, a magnetic stripe reader, such as a Panasonic is model ZU-M1242S1, a bar code reader, or a smart card reader. One microcontroller 220 that may be used is model AT89C51 available from Atmel. The protocol used on the interface to the store computer will depend on the store's computer system itself, and any type protocol could be accommodated. The interface 222 may utilize a serial protocol, such as RS-422, RS-423, RS-449 or RS-485, to communicate with the store computer. These exemplary serial protocols are useful for communications distances greater than 50 feet. Power for the circuit, in one embodiment, is provided by AC line power. It will be understood that the microcontrollers 210, 220 could be consolidated into a single microcontroller, microprocessor, application specific integrated circuit (ASIC), programmable gate array, or any other desired functional partitioning.

Software Functions

The microprocessor 220 (FIG. 13) performs two overall functions, effectively in parallel: cart return detection and credit granting. A cart return detection function 300 will be described in conjunction with FIG. 14. A credit granting function 350 will be described in conjunction with FIG. 15.

Figure 14:
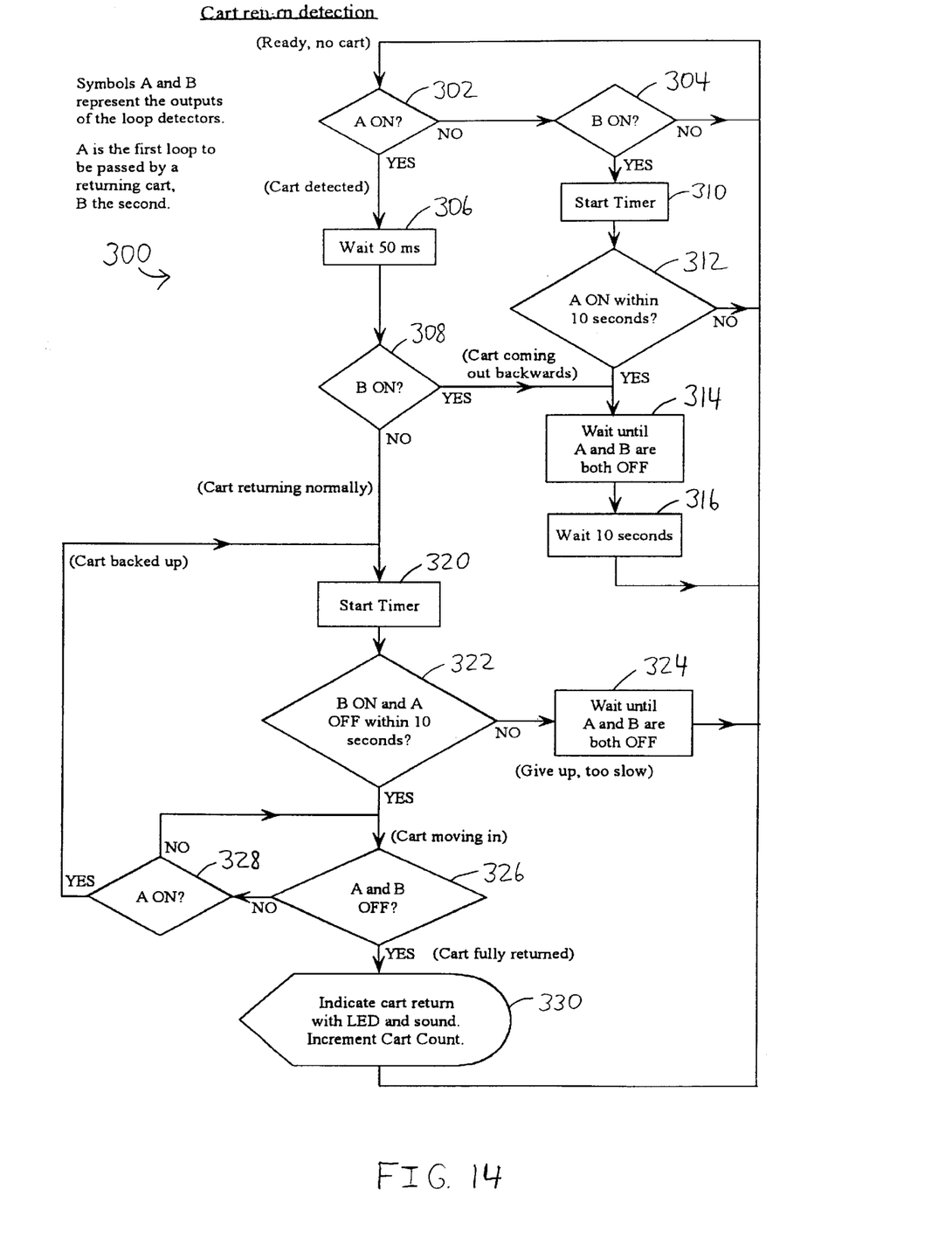
FIG. 14 is a flowchart of a cart return detection function performed by the system electronics unit shown in any of FIG. 1, 3, 6, 10 or 11.

Referring to FIGS. 13 and 14, the microcontroller 220 uses the loop sensors 102 to determine if a cart has been pushed into the cart corral or pulled out. This is determined by looking at the timing of the two "cart detected" signals from one cart lane (loops A and B). If the cart is detected first in the "front" loop, the cart is going in, if first detected in the "rear" loop, the cart is going out. If the cart is going out, this "cart detected" signal is rejected and is ignored by the computer software. Once a cart is pushed all the way into the corral (both detectors indicate no cart present), the software internally records one cart "count". If a customer ID card is "swiped" through the card reader, that customer is credited with returning a cart. The customer ID code data is transmitted through the interface 222 to the store computer 420 (FIG. 16).

Returned carts are counted in a variable, and the count is decremented when a customer swipes a card through the reader 110 and is granted a credit by the store computer. Thus the customer's ID card does not need to be swiped through the card reader 110 immediately. Several carts could be returned and the corresponding customers can swipe their cards through the reader in any order.

Several software functions will help deter abuse of the system through "stealing" credits. Only one credit will be granted per customer per unit time. For instance, one credit per eight hours. Of course, this time period could be set to a different time interval. If a cart is detected as being pulled from a particular lane and then a cart (the same or a different cart) is returned through that lane too rapidly (within ten seconds, for instance), that cart return may be credited.

The flowchart shown in FIG. 14 is one possible embodiment of the cart return detection 300. The symbols A and B represent the outputs of two loop detectors (such as for the embodiment shown in FIG. 3) in the flowchart for the cart return detection function 300 in FIG. 14. The symbol A represents the first loop to be passed by a returning cart and the symbol B represents the second loop. Beginning at a decision state 302 of FIG. 14, function 300 is at a ready condition for a shopping cart. Function 300 periodically checks to see if loop A is on, i.e., a cart has been detected. If not, function 300 proceeds to a decision state 304 to determine if loop B is on. If loop B is determined (by a cart detector 200) to not be on, function 300 proceeds back to decision state 302 to again check if loop A is on. If a determination is made at decision state 302 that loop A is on, function 300 moves to state 306 and waits for an period of 50 msec in one embodiment. The wait period should help if several carts are passed through in rapid succession, and should help reject electrical noise that triggers both A and B sensors simultaneously. Continuing at a decision state 308, function 300 checks to see if loop B is on. If loop B is on at the completion of the wait period of state 306, the cart is deemed to be coming out of the cart corral backwards and function 300 proceeds to state 314. At state 314, function 300 waits until both loops are both off. Proceeding to state 316, function 300 then waits a predetermined time interval, e.g., ten seconds in one embodiment, before moving back to state 302 to be ready to check for loop A again.

If loop A is determined to be off at decision state 302 and loop B is determined to be on at decision state 304, function 300 moves to state 310 and starts a timer. Proceeding to a decision state 312, function 300 determines if loop A becomes on within a predetermined time interval, e.g., ten seconds in one embodiment. If so, the cart is being pulled out backwards from the cart corral and function 300 advances to state 314 to wait until loops A and B are both off. However, if, at decision state 312, it is determined that loop A does not become on within the predetermined time interval, e.g., ten seconds, function 300 moves back to decision state 302 as previously described.

Returning now to decision state 308, if loop B is not on at the completion of the wait period of state 306, the cart is deemed to be normally returned into the cart corral and function 300 proceeds to state 320. At state 320, function 300 starts a timer. Proceeding to a decision state 322, function 300 determines if loop B becomes on and loop A becomes off within a predetermined time interval, e.g., ten seconds in one embodiment. If not, function 300 deems the customer as being too slow to move the cart and gives up processing the current cart. Proceeding to state 324, function 300 waits until loops A and B are both off and then moves back to decision state 302, as previously described. However, if, at decision state 322, it is determined that loop B becomes on and loop A becomes off within the predetermined time interval, e.g., ten seconds, function 300 deems that the cart is moving forward into the cart corral.

Moving to a decision state 326, function 300 determines if both loops A and B are off, i.e., that the cart has passed both loops into the cart corral. If not, function 300 proceeds to a decision state 328 to check if loop A is on. If not, it is deemed that the cart is still being moved into the cart corral and function 300 moves back to decision state 326 to see if loop B has been passed and is off. However, if, at decision state 328, it is determined that loop A is now on, it is deemed that the cart is being backed out of the cart corral and function 300 moves back to state 320 to start the timer as previously described. By going to state 320, the customer may hesitate but still finish returning the cart and receive credit. Also, the apparent backwards motion may only be sensor noise with the cart positioned on the threshold of triggering sensor A. Returning to decision state 326, if it is determined that both loops A and B are now off, i.e., that the cart has passed both loops into the cart corral, function 300 proceeds to state 330 to indicate the completed cart return by activating a LED or other visual indicator and/or activating an aural indicator to generate a sound. The function 300 also increments a "cart count" variable and then moves back to state 302 in a ready condition for another cart.

Figure 15:
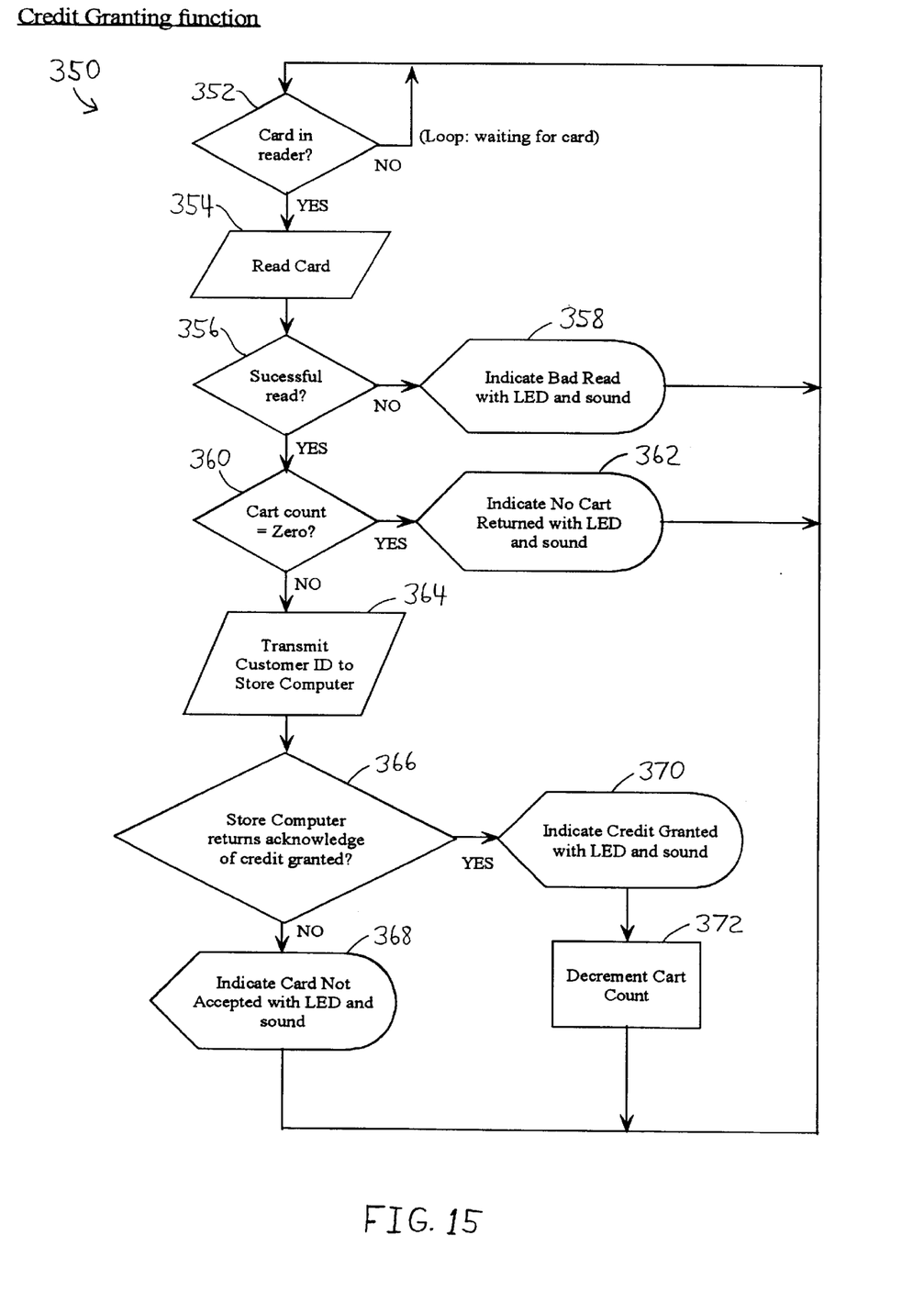
FIG. 15 is a flowchart of a credit granting function performed by the system electronics unit shown in any of FIG. 1, 3, 6, 10 or 11.

Referring now to FIGS. 13 and 15, the credit granting function 350 will now be described. The software running on the microcontroller 220 provides some indication of a successful cart return and a successful card reading to the customer through one or more light emitting diodes (LEDs) and optionally, audible indications. For example, a green LED and a short bleep tone may be provided when a cart is returned, and a bell tone or coin sound may be provided when a card is successfully swiped through the card reader. A failed card swipe might be indicated by a red LED and another type of sound.

Beginning at a decision state 352 of FIG. 15, function 350 determines if a customer ID card is in the card reader 110. If not, function 350 loops back to decision state 352 to wait for an ID card to be swiped through the reader. When a card is detected in the reader 110, at decision state 352, function 350 reads the data on the ID card at state 354 and advances to a decision state 356 to determine if the read was successful. If the read was not successful, function 350 moves to state 358 to report a bad read by activating a visual indicator, e.g., a LED, and/or activating an audible indicator to generate a sound. At the completion of state 358, function 350 moves back to decision state 352 to check for a card in the reader 110. However, if the read was successful, as determined at decision state 356, function 350 proceeds to a decision state 360 to determine if the "cart count" variable is equal to zero. If so, function 350 advances to state 362 to indicate that no cart was returned by activating a visual indicator and/or an audible indicator. At the completion of state 362, function 350 moves back to decision state 352 to check for a card in the reader 110.

Returning to decision state 360, if "cart count" is not equal to zero, function 350 moves to state 364 and transmits the customer identification code, in one embodiment, to the store computer 420 (FIG. 16). Advancing to a decision state 366, function 350 determines if the store computer returns an acknowledgment that a credit was granted for the customer. If not, function 350 proceeds to state 368 to indicate that the customer ID card was not accepted by the store computer by activating a visual indicator and/or activating an audible indicator. At the completion of state 368, function 350 moves back to decision state 352 to check for a card in the reader 110. However, if the store computer returns an acknowledgment that a credit was granted for the customer, as determined at decision state 366, function 350 continues at state 370. At state 370, function 300 indicates that a customer credit corresponding to the customer ID card was granted by the store computer by activating a visual indicator and/or activating an audible indicator. At the completion of state 370, function 350 moves to state 372 to decrement the cart count variable by one and then moves back to decision state 352 to check for a new card in the reader 110.

Store and Enterprise Connectivity

Referring to FIG. 16, the combination of the cart return loyalty credit system 100 with a store network 400 will be described. In one embodiment, the system 100 is integrated with an existing frequent shopper program for a particular store or chain of stores. Alternatively, the system 100 could be incorporated in another reward or sales program such as a prepaid phone card or video rental card program.

In one embodiment, the retailer "collects" a customer's credits and issues them at a point of sale as discounts, freebies, phone card credits, etc. The system may also get manufacturers, e.g., Coca Cola, to give "specials" from time to time in return for credits, thus shifting the cost of credits from the retailer to the manufacturer (e.g., Coke or Coors).

When a customer 402 joins a particular shopping program, a customer ID (reward) card 404 having a customer ID number or code is issued to the customer. This ID code may be encoded on the card 404 as a bar-code, in a magnetic stripe, or stored in the memory of a smart card, for instance. In another embodiment, the store may use identification information on a customer's debit card, credit card, or the account information on the customer's checks, for example, as a customer code so as to avoid having to issue another card to the customer. To maintain security of the code, it could be encrypted at the sensor and control electronics 113 and decrypted by a store or central computer. The store may also allow use of either a debit/credit card, check or a reward card, depending on whether the customer is paying for the purchase by debit, credit, check, or cash. A customer 402 receives frequent shopper or reward credits, points, or the like for purchases, store visits, and other criteria as defined by the particular frequent shopper program. For example, when the customer purchases store products 432 at store A (410), the products are scanned by a scanner 430 at a checkout point-of-sale (POS) location. The customer 402 receives credits based on the purchases to the account identified by customer code on the ID card 404, or other identification as described above, which is scanned or read by scanner 430 or other card input device.

These credits or points, the customer identification, the identity of the purchased products, date and time information are passed on to an input/output interface 422 of the store computer 420. The purchased product information is stored in product files 424 and the credits are stored in an incentive points file 426 which is indexed by customer code. Time and date information for the transaction may be stored for both files 424 and 426. Customer information, such as provided by the customer when the ID card 404 was issued, is stored in file 428. Information on products purchased by the customer and other information learned about the customer may also be stored in the customer file 428.

If the store belongs to a chain (of stores) or is affiliated in some way with other stores having a frequent shopper program, store A may communicate store data periodically to a central computer or computer network 440. Store B (442), and other stores through store N (444) may also communicate with the central computer 440 via a link, such as, for example, a network, a satellite or a telephone link. The network link may be an intranet, an extranet, or an Internet link.

The actual reward of a particular frequent shopper program may vary between various businesses and campaigns. One type of reward is a reward certificate, which could be a voucher for cash or product purchases at the business that issued the reward card, or the reward certificate could be a negotiable check. Furthermore, an affinity relationship could be established where the frequent shopper receives points in another frequent purchaser plan such as airline frequent flyer miles.

By use of the cart return loyalty credit system 100, a customer 402 receives frequent shopper credits for returning the shopping cart 160 to the store's cart corral or other designated location. The loop sensors 102, in conjunction with the cart detectors 200, detect a returned cart 160 and signal the microcontroller 220 of that event. The customer 402 then uses his ID card 404 in the card reader 110, or card scanner or detector in another embodiment, to provide his customer ID or code to the microcontroller 220. The microcontroller sends the customer code, date, time and any other information, such as a cart corral identification code, to the store computer 420 via the interface line 222. Alternatively, the information may be sent directly to the central computer 440. The store computer then provides an acknowledgment signal to the microcontroller 220 so as to notify the customer of a successful reward credit transaction.

While the above detailed description has shown, described, and pointed out the fundamental novel features of the invention as applied to various embodiments, it will be understood that various omissions and substitutions and changes in the form and details of the system illustrated may be made by those skilled in the art, without departing from the concepts of the invention.

What is claimed is:

1. A cart return system for use by a store utilizing a computer, the system comprising:
   a detection loop arranged at the entrance to a cart return location;
   a loop oscillator circuit connected to the detection loop, wherein a frequency is influenced by moving a cart proximate to the detection loop; and
   a processing circuit, connected to the loop oscillator circuit, being capable of detecting a change in inductance of the loop and identifying a cart return condition in response to the loop oscillator circuit, wherein the processing circuit is adapted to provide a customer identification code to the computer, wherein the customer identification code is unique to each customer and which is input to the system by the customer.

2. The cart return system defined in claim 1, additionally comprising another detection loop and another loop oscillator circuit so as to detect a direction of a cart in the entrance to the cart return location.

3. The cart return system defined in claim 1, wherein the processing circuit includes a control circuit detecting a change in inductance of the loop so as to specify a cart detected condition in response to the loop oscillator circuit.

4. The cart return system defined in claim 3, wherein the processing circuit includes a processor identifying the cart return condition in response to the control circuit.

5. The cart return system defined in claim 4, wherein the control circuit comprises a first microcontroller and the processor comprises a second microcontroller.

6. The cart return system defined in claim 1, wherein the processing circuit includes a customer identification device that provides the customer identification code responsive to the cart return condition.

7. The cart return system defined in claim 6, wherein the customer identification device is a card reader.

8. The cart return system defined in claim 7, wherein a customer identification card may be swiped in the card reader.

9. The cart return system defined in claim 1, wherein the customer identification code corresponds to a customer who returns a shopping cart to the cart return location.

10. A method of providing an incentive for a customer of a store to return a shopping cart to a cart return location having a detection loop at the entrance to the cart return location, the method comprising:
   detecting a change in inductance of the loop when a cart is moved proximate to the detection loop;
   generating a cart return signal, which is indicative of a returned cart, responsive to the change of inductance;
   inputting a customer identification code proximal in time to the cart return signal, wherein the customer identification code is unique to each customer; and
   sending the customer identification code to a computer.

11. The method defined in claim 10, wherein the customer identification code is obtained from a customer identification card.

12. The method defined in claim 10, additionally comprising generating a signal indicative of a cart return status.

13. The method defined in claim 12, additionally comprising activating an indicator responsive to the signal indicative of the cart return status.

14. The method defined in claim 10, additionally comprising generating a signal indicative of an acknowledgment by the computer.

15. The method defined in claim 14, additionally comprising activating an indicator responsive to the signal indicative of the acknowledgment by the computer.

16. The method defined in claim 10, additionally comprising updating a customer loyalty database indexed by the customer identification code with a prespecified number of points associated with a cart return.

17. The method defined in claim 10, wherein the sending comprises wireless signaling between the cart return location and the computer.

18. The method defined in claim 10, wherein the sending comprises wired signaling between the cart return location and the computer.

19. A cart return system, comprising:
   a detection loop arranged at the entrance to a cart return location;
   a loop oscillator circuit connected to the detection loop, wherein a frequency is influenced by moving a cart proximate to the detection loop; and
   a processing circuit, being capable of detecting a change in inductance of the loop and identifying a cart return condition in response to the loop oscillator circuit, wherein the processing circuit is adapted to provide a customer identification code, wherein the customer identification code is unique to each customer and which is input to the system by the customer.

20. The cart return system defined in claim 19, additionally comprising another detection loop and another loop oscillator circuit so as to detect a direction of a cart in the entrance to the cart return location.

21. The cart return system defined in claim 19, wherein the processing circuit includes a control circuit detecting a change in inductance of the loop so as to specify a cart detected condition in response to the loop oscillator circuit.

22. The cart return system defined in claim 21, wherein the processing circuit includes a processor identifying the cart return condition in response to the control circuit.

23. The cart return system defined in claim 22, wherein the control circuit comprises a first microcontroller and the processor comprises a second microcontroller.

24. The cart return system defined in claim 19, wherein the processing circuit includes a customer identification device that provides the customer identification code responsive to the cart return condition.

25. The cart return system defined in claim 24, wherein the customer identification device is a card reader.

26. The cart return system defined in claim 25, wherein a customer identification card may be swiped in the card reader.

27. The cart return system defined in claim 19, wherein the customer identification code corresponds to a customer who returns a shopping cart to the cart return location.

28. The cart return system defined in claim 19, wherein the processing circuit is connected to a computer affiliated with a store and provides the customer identification code via the connection.

29. The cart return system defined in claim 19, wherein the customer identification code is stored in a memory connected to the processing circuit.

30. The cart return system defined in claim 29, wherein the memory is integrated into the processing circuit.

31. A method of providing an incentive for a customer of a store to return a shopping cart to a cart return location having a detection loop at the entrance to the cart return location, the method comprising:
   detecting a change in inductance of the loop when a cart is moved proximate to the detection loop;
   generating a cart return signal, which is indicative of a returned cart, responsive to the change of inductance;
   inputting a customer identification code proximal in time to the cart return signal, wherein the customer identification code is unique to each customer; and
   storing the customer identification code in a memory.

32. The method defined in claim 31, wherein the customer identification code is obtained from a customer identification card.

33. The method defined in claim 31, additionally comprising generating a signal indicative of a cart return status.

34. The method defined in claim 33, additionally comprising activating an indicator responsive to the signal indicative of the cart return status.

35. The method defined in claim 31, additionally comprising updating a customer loyalty database indexed by the customer identification code with a prespecified number of points associated with a cart return.

36. The method defined in claim 31, additionally comprising storing the customer identification code in a computer affiliated with the store.

37. The method defined in claim 36, additionally comprising generating a signal indicative of an acknowledgment by the computer.

38. The method defined in claim 37, additionally comprising activating an indicator responsive to the signal indicative of the acknowledgment by the computer.

39. The method defined in claim 36, wherein storing the customer identification code in the computer comprises wireless signaling between the cart return location and the computer.

40. The method defined in claim 36, wherein storing the customer identification code in the computer comprises wired signaling between the cart return location and the computer.

41. A system of providing an incentive for a customer of a store to return a shopping cart to a cart return location having a detection loop at the entrance to the cart return location, the system comprising:
   means for detecting a change in inductance of the loop when a cart is moved proximate to the detection loop;

means for generating a cart return signal, which is indicative of a returned cart, responsive to the change of inductance;

means for inputting a customer identification code proximal in time to the cart return signal, wherein the customer identification code is unique to each customer; and means for storing the customer identification code.

42. A method of providing an incentive for a customer of a store to return a shopping cart to a cart return location having a detection loop at the entrance to the cart return location, the method comprising:

detecting a change in inductance of the loop;

generating a cart return signal, which is indicative of a returned cart, responsive to the change of inductance;

obtaining a customer identification code proximal in time to the cart return signal;

sending the customer identification code to a computer; and updating a customer loyalty database indexed by the customer identification code with a prespecified number of points associated with a cart return.

43. A method of providing an incentive for a customer of a store to return a shopping cart to a cart return location having a detection loop at the entrance to the cart return location, the method comprising:

detecting a change in inductance of the loop;

generating a cart return signal, which is indicative of a returned cart, responsive to the change of inductance;

obtaining a customer identification code proximal in time to the cart return signal;

storing the customer identification code in a memory; and updating a customer loyalty database indexed by the customer identification code with a prespecified number of points associated with a cart return.

\* \* \* \* \*

UNITED STATES PATENT AND TRADEMARK OFFICE
CERTIFICATE OF CORRECTION

PATENT NO. : 6,486,768 B1
DATED : November 26, 2002
INVENTOR(S) : French et al.

It is certified that error appears in the above-identified patent and that said Letters Patent is hereby corrected as shown below:

Title page,
Item [56], References Cited, FOREIGN PATENT DOCUMENTS, the following reference should be added:
-- DE 196 25 525 A1   1/1998 --

Signed and Sealed this

Sixteenth Day of December, 2003

JAMES E. ROGAN
*Director of the United States Patent and Trademark Office*